2 Sheets—Sheet 1.

W. WILSON, Jr.,

Assignor of one-half interest to C. GREEN.

Machine for Looping and Cutting Wire.

No. 9,404. Reissued Oct. 12, 1880.

Attest:

John Dolley, Jr.

John K. Rupertus.

Inventor:

William Wilson Jr.,

By his Attorneys,

W. C. Strawbridge

J. Bonsall Taylor

N. PETERS, PHOTO-LITHOGRAPHER, WASHINGTON, D. C.

W. WILSON, Jr.,

Assignor of one-half interest to C. GREEN.

Machine for Looping and Cutting Wire.

No. 9,404. Reissued Oct. 12, 1880.

Attest:

John Dolley, Jr.

John K. Rupertus

Inventor:

William Wilson Jr.

By his Attorneys.

W. C. Strawbridge

J. Bonsall Taylor

N. PETERS, PHOTO-LITHOGRAPHER, WASHINGTON, D. C.

UNITED STATES PATENT OFFICE.

WILLIAM WILSON, JR., OF GREENVILLE, DELAWARE, ASSIGNOR OF ONE-HALF OF HIS INTEREST TO CHARLES GREEN.

MACHINE FOR LOOPING AND CUTTING WIRE.

SPECIFICATION, forming part of Reissued Letters Patent No. 9,404, dated October 12, 1880.

Original No. 214,977, dated April 29, 1879. Application for reissue filed July 1, 1880.

*To all whom it may concern:*

Be it known that I, WILLIAM WILSON, Jr., of Greenville, in the county of New Castle, State of Delaware, have invented a new and useful Machine for Looping and Cutting Wire, of which the following is a specification, reference being made to the accompanying drawings, forming part hereof.

My invention relates to a class of mechanism which is used to twist a loop upon wire and to cut the looped wire to a given length.

Looped wire is employed for various purposes in the arts—for instance, as an opening device for tin cans, as a means of securing tags, and of baling cotton, grain, and the like.

The invention consists of a frame upon which revolves a circular table, which carries a series of twisting-hooks operated by pinions secured thereto, which, at stated intervals, engage with a rack supported from the frame, and also carries a corresponding series of cutting devices employed to cut the looped wire into given lengths. The cutting devices are operated by a cam, which is situated beneath the revolving table in the frame-work of the machine.

The object of my invention is the rapid manufacture of looped sections of wire.

Figure 1:
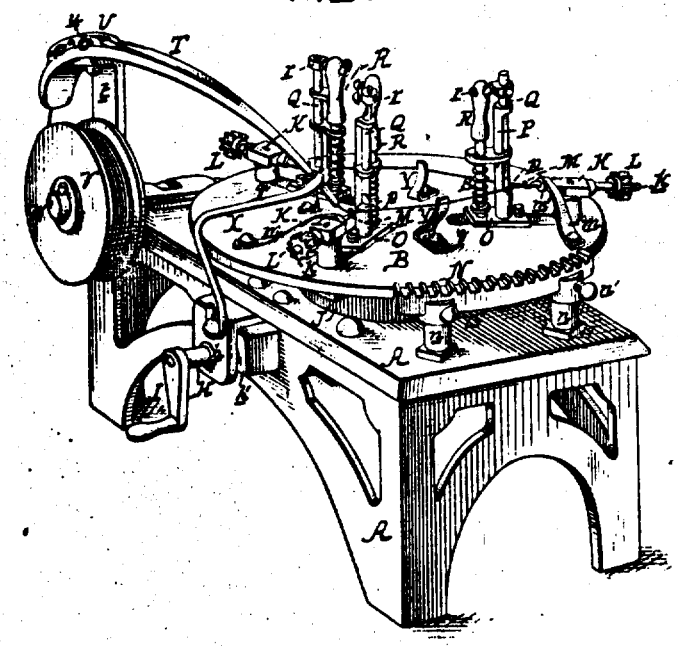
Figure 2:
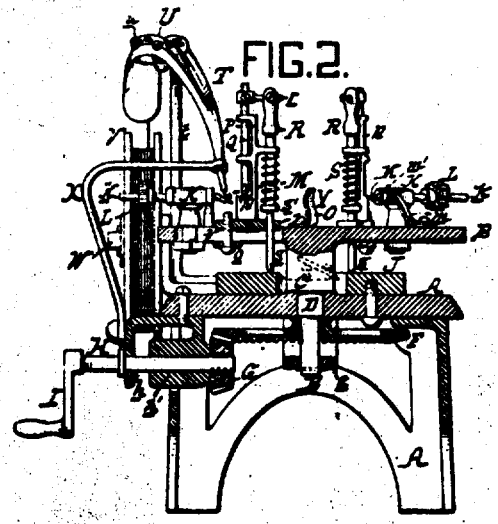
Figure 3:
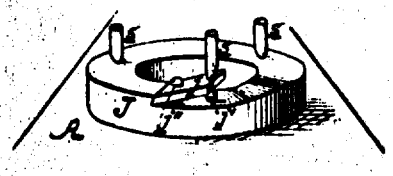
Figure 5:
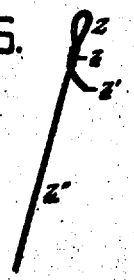
Figure 4:
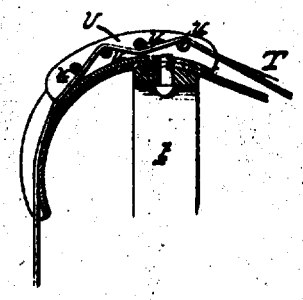

In the drawings, Figure 1 is a perspective view of a machine embodying my invention; Fig. 2, a transverse sectional elevation of the same; Fig. 3, a perspective detail of the camway which insures the operation of the cutting-knives; Fig. 4, a section of the wire-tension device; Fig. 5, a view of a given section of wire as produced by my machine, and Fig. 6 a view of a section formed into a loop.

Similar letters of reference indicate corresponding parts.

A is the frame of the machine, of any suitable construction. B is a revolving table, well made, of circular outline, and provided with a spindle, C D E, suitably journaled—as, for instance, at D and in *e*. Upon the spindle E is secured a bevel-gear wheel, F, which meshes with a bevel-pinion, G, secured upon a shaft, H, suitably journaled at *h h'*, and provided with a crank or driving wheel, I.

By the above devices the table is rotated at the desired speed. At points near the periphery of the table are a series of standards, K, which serve as bearings for spindles *k*, which are formed into hooks M at their inner extremities, are conveniently held in place by collars *m'*, and are provided with pinions L at their outer extremities. The pinions L are so set that in the revolution of the table they successively encounter and are rotated by the teeth of the stationary rack N. This rack is erected upon the frame, and may be conveniently secured by set-screws *n' n''* and standards *n n*. The collar *m'* of the spindle *k* has an offset in it, which, by encounter with the spring-arm *m*, prevents the spindle and hook from revolving backward, and at the same time holds the hook in such position as to enable it to readily take the wire from the feed T and to permit the easy throwing off of the wire when cut.

In the same radial lines with the wire-twisting devices just described are a corresponding series of wire-cutting devices, conveniently composed as follows: O are a series of plates adjustably secured, by means of bolts *o*, in slots *q* in the table. Upon the plates are vertically-erected standards P, provided with bearings projecting laterally on both sides. In these bearings respectively play the cutter Q and the spring-controlled lifting-rod R which operates the same, connection being effected by a bridge-piece, *r*, well shown in Fig. 2. Affixed to the rod R is a collar, *s'*, between which and the guide in which the lifting-rod plays is a spiral spring, S. The lifting-rod passes down through an opening in the plate O, and its lower extremity rests and presses upon the camway and travels upon a circular camway, J, in the frame, as shown in Fig. 3. The camway J is a level track, except as to a portion in which the leaf *j* is placed. This leaf is secured to the camway by screws *j''*, and can be placed at any desired angle by means of the screw *j'*.

The lower portion of the standard P is enlarged to form a cutting-table, *p*, to knife Q.

It will now be understood that as the lifting-rods are rotated with the table they are each in succession caused to travel over the camway-leaf, whereby they are successively elevated, and with them the cutters, the spirals being in turn compressed. At the moment when any given lifting-rod is caused to travel over the uppermost edge of the leaf its spring S forces its cutter sharply down upon the table *p*, severing the wire which has been fed across said table, as hereinafter set forth.

At one end of the frame the wire-carrier V is held upon shaft W. The wire is passed over and under the pins *u* of a tension device, U, located upon the feed T, which latter is supported upon an upright, *t*, and is kept in the proper position by the rod *x*. Upon the table B are springs Y, against which the wire is drawn, and which, when said wire is severed, aid to throw it off in the form shown in Fig. 5.

Figure 6:
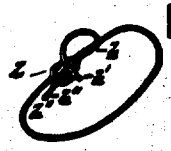

When the looped wire is to be used for attaching tags, baling hay, &c., it may be formed into a ring in the manner shown in Fig. 6, or the unlooped end *z''* may be pushed through the loop and twisted around the tongue.

The following is the method of operation of my invention: When the table is revolved it carries hooks M successively beneath the feed T in such manner that they hook the wire. In its continued revolution the pinions L are caused to mesh into the rack N, so as to revolve the hooks M, whereby a loop is twisted upon the wire. The rack N is made of such a length that the hooks are in turn left with their open sides up, as in the first position, for taking the wire. As the table further revolves the cam-leaf *j* successively raises the cutters Q, which, in springing back, cut off that end of the wire which lies upon the table *p* of the knife-standard P. This above action makes a loop, Z, above the twisted wire *z*, and leaves a long end, *z''*, and a short end, *z'*, as in Fig. 5.

While I have described only certain specific mechanisms and a certain fixed and determinate arrangement of the same, I desire it understood that I contemplate the use and application of various equivalent and allied devices and constructions in the embodiment of my invention in practical forms. Thus, for instance, the table and attachments might be made stationary, while the frame and attachments might be caused to move.

Having thus described my invention, I claim—

1. In a machine for looping and cutting wire, a revolving table provided with devices which are suitably operated to automatically cut previously-looped wire into required lengths.

2. In a machine for looping and cutting wire, a revolving table provided with devices which are suitably operated to automatically form loops upon and cut the wire into given lengths, in combination with a device to direct the wire to said looping and cutting devices, substantially as shown and described.

3. In a machine for looping and cutting wire, the combination with a revolving table provided with devices which are suitably operated to automatically form the wire into loops and with devices which are suitably operated to automatically cut the looped wire into given lengths, of the mechanism which causes the operation of the looping and cutting devices, substantially as described.

4. In a machine for looping and cutting wire, the combination, with a revolving table provided with hooks to receive and form the wire into loops and with cutters to cut the looped wire into given lengths, of a rack and a cam, respectively located outside of said revolving table, and adapted by the revolution of said table to cause the operation of the looping and cutting devices, substantially as described.

5. The combination of the table B, spindle *k*, hooks M, pinions L, rack N, and cutting-knife Q, substantially as and for the purpose specified.

6. The combination of the spindle *k*, supplied with hook M and pinion L, with collar *m'* and spring *m*, substantially as and for the purpose specified.

7. The cutting-knife Q, in combination with the rods R *s*, connected at the top, spring S, and camway J, substantially as and for the purpose specified.

8. The cutting-knife Q, in combination with the hooks M and spring Y, substantially as and for the purpose set forth.

9. The table B, having slots *q* and plate O, supporting the knife Q, in combination with the hook M, whereby the lengths of the ends *z'* and *z''* of the wire may be regulated, substantially as shown.

In testimony whereof I have hereunto signed my name this 23d day of June, A. D. 1880.

WM. WILSON, JR.

In presence of—

SAMUEL E. CAVIN,
J. BONSALL TAYLOR.